Patented May 7, 1935

2,000,759

UNITED STATES PATENT OFFICE 2,000,759

METHOD OF CURING CONCRETE

Arthur A. Johnson, Great Neck, N. Y.

No Drawing. Application April 15, 1933,
Serial No. 666,353

9 Claims. (Cl. 25—154)

This invention relates to an improved process of curing fresh concrete by applying thereto substances producing a water impervious film of special properties and of a novel composition. It is well known that concrete structures in order to cure properly must retain sufficient water during the setting period, otherwise an insufficient hydration or incomplete chemical reaction will result, in which case the concrete will not possess the requisite strength or density and will be subject to cracking and scaling. Although sufficient water is present when the concrete is poured yet unless special precautions are taken evaporation of the water will take place after pouring and during the curing period with the resulting disadvantages mentioned. For this reason it has been proposed by several workers in this art to coat the concrete with a water impervious coating of a permanent or temporary character shortly following the pouring of the concrete whereby to effectively seal the surface against escape of moisture.

It is a principal object of the present invention to provide a method of curing concrete employing an improved water impervious coating. It is also an object to provide an improved coating composition for this purpose. Heretofore a substance widely proposed for the curing of concrete has been an asphalt or other similar bituminous substance in the form of a water emulsion. The coating formed from this mixture has certain disadvantages which it is desired to overcome.

My present invention is based upon the discovery that new and desirable qualities are imparted to bituminous curing agents for curing concrete by the incorporation therein of rubber, preferably in the form of rubber latex. I find that a mixture of a bituminous emulsion, for example, and latex in suitable proportions produces a coherent film which while very thin is nevertheless absolutely impervious, for all practical purposes, to passage of moisture, a result which is not completely obtained when the concrete is coated with ordinary water emulsions of bitumen. My invention also provides a film of great elasticity and toughness and one which furthermore will not flow under the heat of the sun (thus leaving parts of the concrete exposed) as is apt to be the case with the coating formed from the ordinary bituminous emulsion. Neither will the film tend to disintegrate and flake off due to oxidation and the effects of strong sunlight as may be the case with coatings consisting entirely of bitumen. A quality possessed by the film produced by me is that it may be peeled off. Owing to the dark color of the film, this is an advantage of high order. The film further has great coherency and the liquid composition has high covering power whereby irregularities in the surface are effectively coated. Because of the elasticity of the film it will retain its impervious characteristics irrespective of expansion and contraction, vibration or flexure of the surface to which it is applied. I have further found that the presence of the latex increases the stability of the bituminous emulsion and thus overcomes a further disadvantage of the ordinary bituminous emulsion which is its tendency to settle out just before application.

In preparing my new composition I preferably employ a mixture consisting essentially of a bituminous emulsion in water in which is incorporated rubber latex. As a specific example illustrative of my invention the following may be given:

A bituminous emulsion (mixture A) is first prepared as follows:

| | Parts |
|---|---|
| Trinidad or other suitable asphalt | 48 |
| Water | 52 |
| Protective colloid | 10 |

The asphalt is first reduced to about 20 mesh size and the water then added together with sodium oleate or other soluble soap, gelatine, casein, etc., as a protective colloid. The entire mixture is then passed through a colloid mill to form a suitable emulsion.

The latex compound (mixture B) may now be prepared so as to contain—

| | Parts |
|---|---|
| Latex (38% rubber) | 96 |
| Sulphur (in colloidal form) up to | 3 |
| Sodium benzoate | 2 |

Suitable proportions of mixtures A and B are now mixed together, as for example mixture A 75 parts and mixture B 25 parts by volume.

The sodium benzoate is useful to insure the absence of bacterial fermentation or decomposition, the amount used varying depending upon climatic conditions. Thus in hot and somewhat humid weather the factor of fermentation must be carefully taken into account, particularly since when the mixture is spread upon a surface so as to form a film, the ammonia with which the latex was originally preserved evaporates, thereby leaving the film formed without a preservative. On the other hand, under conditions less conducive to fermentation the amount of sodium benzoate may be cut down or even omitted and reliance placed upon the action of the asphalt as a preservative. In place of or in addition to the sodium benzoate other preservatives may be used such as phenol or phenol derivatives, urea, etc. In addition, certain film strengtheners may be used if found desirable, as for example shellac used in finely powdered form in an amount of the order of 2% of the weight of the latex. The presence of the shellac may under some circumstances be useful in that it decreases the period of tackiness following the spraying of the material. The sulphur acts to vulcanize the rubber when the film is subjected to the heat of the sun and renders the film somewhat tougher. Satisfactory results may, however, be obtained without its use. If desired, small quantities of well known rubber accelerators and activators may be added but usually this is unnecessary. In some instances small amounts of fillers may be added to the compound, such for instance as clay, talc, gypsum, feldspar, bentonite, carbon or lamp black, etc. usually in proportions of from two to five per cent of filler.

By rubber latex I mean not only the milky sap or juice of the species *Heven brasiliensis*, but various other rubber bearing plants.

While the use of rubber in the form of latex is preferred, my invention also contemplates using artificial rubber dispersions. For the bituminous part of the compound I prefer to use a native asphalt, but other asphaltic emulsions may be substituted if of a suitable character.

In use the improved composition is sprayed upon or otherwise applied to the surface of the concrete to be cured and is allowed to remain thereon until the end of the curing period, whereupon it may be removed therefrom if desired by peeling or otherwise. Preferably the coating is applied immediately after pouring and before the concrete has begun to set. In some instances, however, the concrete during the initial setting period of approximately 24 hours may instead be protected by burlap as is well known, or in any other suitable manner, after which the burlap is removed and my coating applied for the remainder of the curing period which usually is considered to last from two weeks to a month.

Because of the black color of the coating, the property of the removability of the film taken with that of sufficient tenacity to thoroughly protect the surface against the escape of moisture is particularly valuable since otherwise the black coating must be allowed to wear off, which process somewhat detracts from the appearance of the roadway.

In contradistinction to a film made of ordinary asphalt which is hard and brittle when cold and fluid when heated, my improved film although containing up to 75% or more asphalt possesses true elasticity and forms an absolutely impervious film. In addition, owing to the comparatively low rubber content, the improved compound has the advantage of cheapness and of low viscosity so as to permit of application by simple spraying. The addition of the later appears to act as a protective against the disintegration of the film due to the effects upon the asphalt of oxidation and actinic light rays. Asphalt, when spread in thin films and exposed to sunlight and air is ordinarily subject to serious deterioration from these causes, and this is very noticeable when ordinary bituminous emulsions of asphalt are used for curing concrete, particularly concrete roadways where the exposure to sun and air is most pronounced. While an ordinary asphalt emulsion curing coating may be seriously disintegrated before the curing period is completed, this is not true of my improved curing film which retains its coherence and impervious characteristics for the full period desired.

I claim:

1. The method of curing concrete, which consists in covering the exposed surfaces of the concrete to be cured with a mixture of bitumen and rubber.

2. The method of curing concrete, which consists in covering the exposed surfaces of the concrete during the curing period with a mixture of bitumen and rubber latex.

3. The method of curing concrete, which consists in covering the exposed surfaces of the concrete with a mixture of bitumen, rubber and sulphur to produce vulcanization of the rubber.

4. The method of curing concrete which consists in covering the exposed surface of the concrete before the same is set with a mixture of bitumen and rubber latex adapted to form a substantially moisture impervious film so as to retain within the concrete substantially the entire initial water content thereof during the curing period.

5. A method of curing concrete which consists in covering the exposed surface of the freshly poured concrete with a layer of burlap or the like, removing the burlap after an initial period of setting and before the curing of the concrete is completed and then coating the surface of the concrete with a film containing bitumen and rubber.

6. The method of curing concrete which consists in coating the exposed surface of the concrete with a mixture containing the following ingredients: bitumen, rubber latex, and a preservative.

7. The method of curing concrete, which consists in covering the exposed surfaces of the concrete to be cured with a water emulsion of bitumen having rubber latex incorporated therein.

8. The method of curing concrete, which consists in covering the exposed surfaces of the concrete to be cured with a water emulsion of native asphalt having rubber latex incorporated therein.

9. The method of curing concrete, which consists in covering the exposed surfaces of the concrete to be cured with a water emulsion of bitumen having rubber latex incorporated therein, in which the rubber latex is present in the proportion of approximately 25%.

ARTHUR A. JOHNSON.